(12) United States Patent
Moritsch

(10) Patent No.: US 6,351,870 B1
(45) Date of Patent: Mar. 5, 2002

(54) COMBINED HIGH PRESSURE CLEANING AND SUCTION APPLIANCE

(75) Inventor: Erich Moritsch, Plochingen (DE)

(73) Assignee: Alfred Kaercher GmbH & Co., Winnenden (DE)

(*) Notice: Subject to any disclaimer, the term of this patent is extended or adjusted under 35 U.S.C. 154(b) by 0 days.

(21) Appl. No.: 09/619,085

(22) Filed: Jul. 19, 2000

Related U.S. Application Data

(63) Continuation of application No. PCT/EP99/00243, filed on Jan. 16, 1999.

(30) Foreign Application Priority Data

Jan. 23, 1998 (DE) .......................... 198 02 457

(51) Int. Cl.$^7$ ................................. A47L 7/00
(52) U.S. Cl. .......................... 15/321; 15/339
(58) Field of Search .................. 15/345, 346, 320, 15/321

(56) References Cited

U.S. PATENT DOCUMENTS

| | | | |
|---|---|---|---|
| 2,531,370 A | | 11/1950 | Thompson |
| 4,336,627 A | * | 6/1982 | Bascus ........................ 15/321 |
| 4,636,230 A | | 1/1987 | Fan |
| 4,656,687 A | * | 4/1987 | Wei ........................... 15/344 X |
| 4,789,310 A | * | 12/1988 | Hung ........................ 15/344 X |
| 4,829,625 A | * | 5/1989 | Wang ........................ 15/344 X |
| 6,125,498 A | * | 10/2000 | Roberts et al. ............... 15/320 |

FOREIGN PATENT DOCUMENTS

| DE | 37 28 287 | 3/1989 |
|---|---|---|
| GB | 2 073 827 | 10/1981 |

OTHER PUBLICATIONS

*Japanese Abstract*, Database WPI, Section PQ, Week 9701, Derwent Publications Ltd., London, GB; Class P28, AN 97–006354, XP002103342 & JP 08 275912 A (Nippon Denshi Service KK), Oct. 22, 1996.

* cited by examiner

*Primary Examiner*—Chris K. Moore
(74) *Attorney, Agent, or Firm*—Barry R. Lipsitz; Douglas M. McAllister

(57) ABSTRACT

In order to keep the dimensions of the drive motor as small as possible in a combined high pressure cleaning and suction appliance incorporating a drive motor whose drive shaft drives both a high pressure pump and a suction fan, it is proposed that the drive shaft of the drive motor be connected to the high pressure pump and to the suction fan via a respective coupling, and that there be provided switching means which, on each occasion, selectively close one of the two couplings and open the other one.

9 Claims, 2 Drawing Sheets

COMBINED HIGH PRESSURE CLEANING AND SUCTION APPLIANCE

This application is a continuation of PCT/EP99/00243 filed Jan. 16, 1999.

BACKGROUND OF THE INVENTION

The invention relates to a combined high pressure cleaning and suction appliance incorporating a drive motor whose drive shaft drives both a high pressure pump and a suction fan.

Such a combined high pressure cleaning appliance is known from DE 3728287 C2 for example. Provision is made therein for the suction turbine and the high pressure pump to form a modular unit, this being connected, when in operation, to the drive motor used for driving both the high pressure pump and the suction fan, accordingly, the drive motor must be designed to be sufficiently large and powerful.

The object of the invention is to design a combined high pressure cleaning and suction appliance of the above type in such a manner that it becomes possible to drive the arrangement with a less powerful and consequently smaller drive motor.

SUMMARY OF THE INVENTION

In accordance with the invention, this object is achieved in the case of a combined high pressure cleaning and suction appliance as described hereinabove in that the drive shaft of the drive motor is connected to the high pressure pump and to the suction fan via a respective coupling, and in that there are provided switching means which, on each occasion, selectively close one of the two couplings and open the other one.

The consequence of such a design is that the drive motor drives just the high pressure pump or just the suction fan at any one time so that the motor can be designed for operating just one of these two devices. Nevertheless, the user is able to select which of the two devices should be driven at any one time, by the motor, by actuating the switching means.

The couplings may be normal rotational couplings such as those readily known to the skilled person. The couplings may, for example, be actuated electromagnetically, hydraulically or pneumatically.

The matter of basic importance is that the actuation should always be such that there can only be one effective rotational connection between the motor and one of the two devices, whilst the connection to the respective other device is then open.

In a particularly preferred embodiment, provision is made for the couplings to be in the form of free-wheel couplings which permit rotational coupling to occur in only one direction of rotation, for the two free-wheel couplings to have opposed directions of permitted rotational coupling, and for the switching means for selectively opening and closing the couplings to be means for reversing the direction of rotation of the drive shaft of the drive motor.

By virtue of such a design, one can obtain a particularly simple form of construction since, in this construction, it is merely necessary to reverse the direction of rotation of the drive shaft of the motor so as to selectively close one or the other of the couplings. The couplings then only drive their respective devices when the drive shaft is rotating in a certain direction, whereas the drive is not taken up in the opposite direction and the coupling free-wheels.

It is propitious for the drive motor, the couplings, the high pressure pump and the suction fan to be arranged so as to be mutually co-axial.

In particular, provision may be made for one coupling and the high pressure pump to be arranged at one end of the drive motor, whilst the other coupling and the suction fan are arranged at the opposite end thereof.

It is propitious for the drive shaft to be disposed vertically in the appliance, whereupon all of the other devices should then be accommodated as a tower-like arrangement in the appliance.

In a modified embodiment, the drive shaft may be disposed horizontally in the appliance, whereupon the other devices would then be arranged side-by-side.

A gearing may be inserted between the coupling for the high pressure pump and the high pressure pump itself, and the same applies for the coupling for the suction fan and the suction fan.

DETAILED DESCRIPTION OF THE INVENTION

Figure 1:
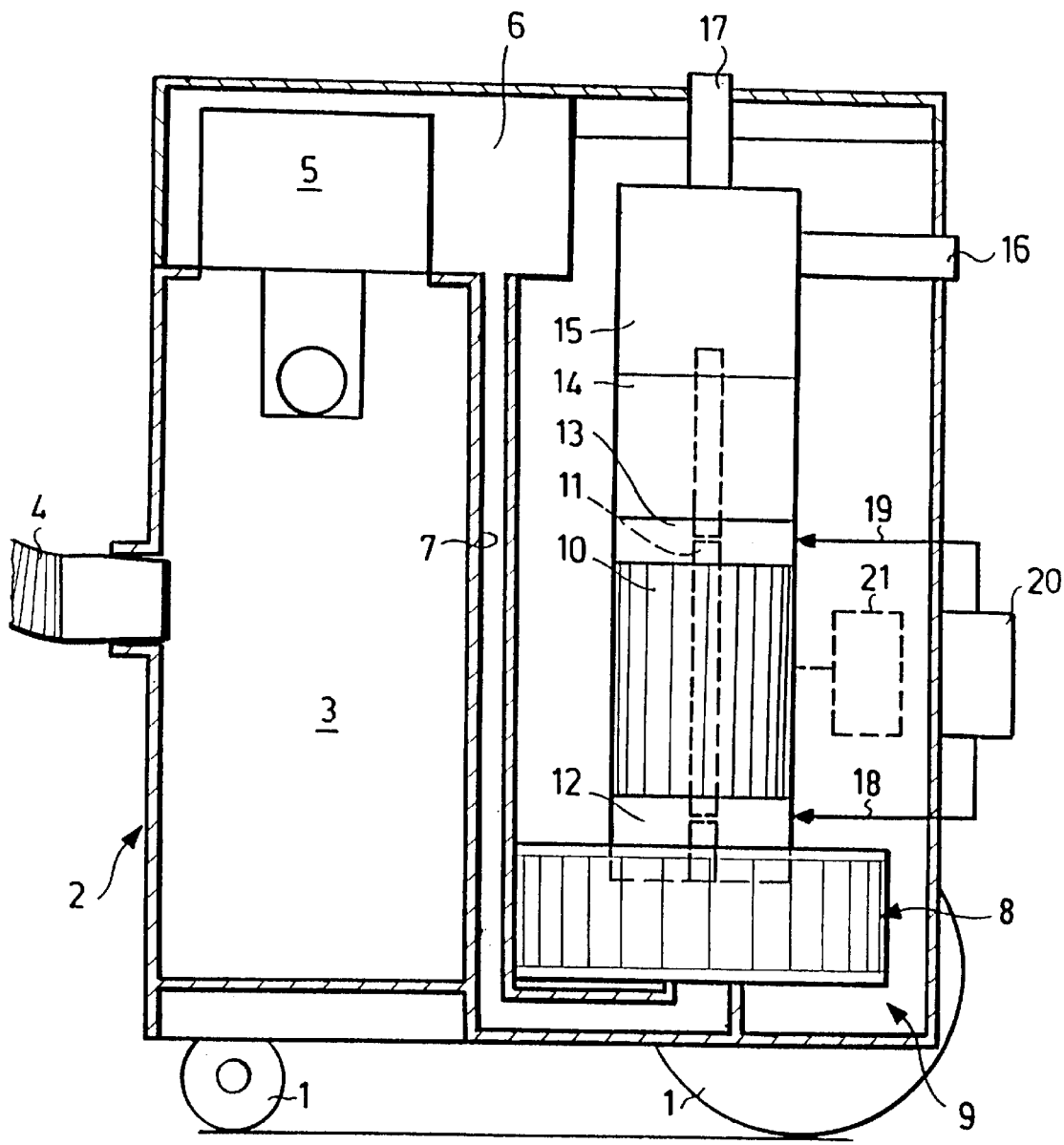
FIG. 1 shows an exemplary embodiment of the invention.

The following description of a preferred embodiment of the invention taken in conjunction with the drawings will serve to provide a more detailed explanation. FIG. 1 shows a schematic longitudinal sectional view through a combined high pressure cleaning and suction appliance wherein only those parts essential to the invention are ilustrated.

This appliance comprises a housing 2 which is movable on wheels 2 and incorporates a dirt collecting container 3 therein. A suction conduit 4, which is connected to a floor suction nozzle that is not illustrated in the drawing, discharges into the dirt collecting container. The top part of the dirt collecting container 3 is covered by a filter 5 which forms a filtered connection from the interior of the dirt collecting container 3 to a suction chamber 6. The suction chamber 6 is connected via a further suction conduit 7 to a suction turbine 8 of a suction device 9. This suction turbine 8 sucks air out of the dirt collecting container 3 through the filter 5 and then expels the cleaned air into the surroundings, whereby a partial vacuum then ensues in the dirt collecting container 3 for sucking a stream of air through the suction conduit 4.

The suction turbine 8 is driven by a drive motor 10 which is arranged co-axially, above the suction turbine 8 with its drive shaft 11 extending vertically. The drive shaft 11 of the drive motor 10 is connected to the suction turbine 8 via a coupling 12.

At its opposite end, the drive shaft 11 of the drive motor 10 is likewise connected via a coupling 13 and a gear box 14 to a high pressure pump 15 which is arranged co-axially, above the drive motor 10 and sucks in a cleaning fluid via a suction conduit 16, said cleaning fluid being expelled at high pressure via a pressure conduit 17 into a flexible high pressure hose provided with a spray lance for example.

The drive motor 10 may be of any type, for example, it may be a universal electric motor or an asynchronous electric motor, but equally, it could be an internal combustion engine.

The couplings 12 and 13 are connected via control lines 18 and 19 to a control means 20 which can be operated by the user such as to close either the coupling 12 or the coupling 13 whilst the respective other coupling remains open thereby ensuring that the drive motor 10 will only drive either the high pressure pump 15 or the suction turbine 8 at any one time. The actuation of the coupling can be effected in various manners, thus, it may, for example, be an electromagnetically actuatable coupling, a hydraulically actuatable coupling or a pneumatically actuatable coupling.

In another embodiment, there is provided a control means 21 (indicated by dashed lines in the drawing) which changes the direction of rotation of the drive shaft 11. This may be effected by either reversing the direction of rotation of the drive motor 10, or, through the intermediary of a gear box connected between the drive shaft 11 and the drive motor 10 which selectively drives the drive shaft in one or the other directions of rotation whilst allowing the electronic motor to run in just one direction.

In addition, the couplings 12, 13 in this embodiment may be in the form of free-wheel couplings i.e. couplings which permit rotational coupling to occur in only one direction of rotation, whereas they free-wheel in the other direction of rotation and thereby convey no torque. The direction of rotation of the two couplings 12 and 13 in which drive is permitted is then made opposite for the two couplings 12 and 13 so that only the suction turbine for example is rotated when the drive shaft 11 is driven in one direction, whereas only the high pressure pump is driven when the direction of rotation of the drive shaft 11 is reversed.

By actuating the control means 20 or by appropriate design of the control means 21, the user is able to select, in operation, as to whether the drive motor should drive the suction turbine or the high pressure pump, but in either case, it is ensured that the drive motor does not have to drive both devices simultaneously, so that the drive motor can be appropriately designed to be of lower performance.

In the embodiment illustrated, the drive motor, the couplings, the suction turbine, the high pressure pump and the intermediate gear box are arranged to be mutually co-axial, whereby their common axis is positioned vertically.

Figure 2:
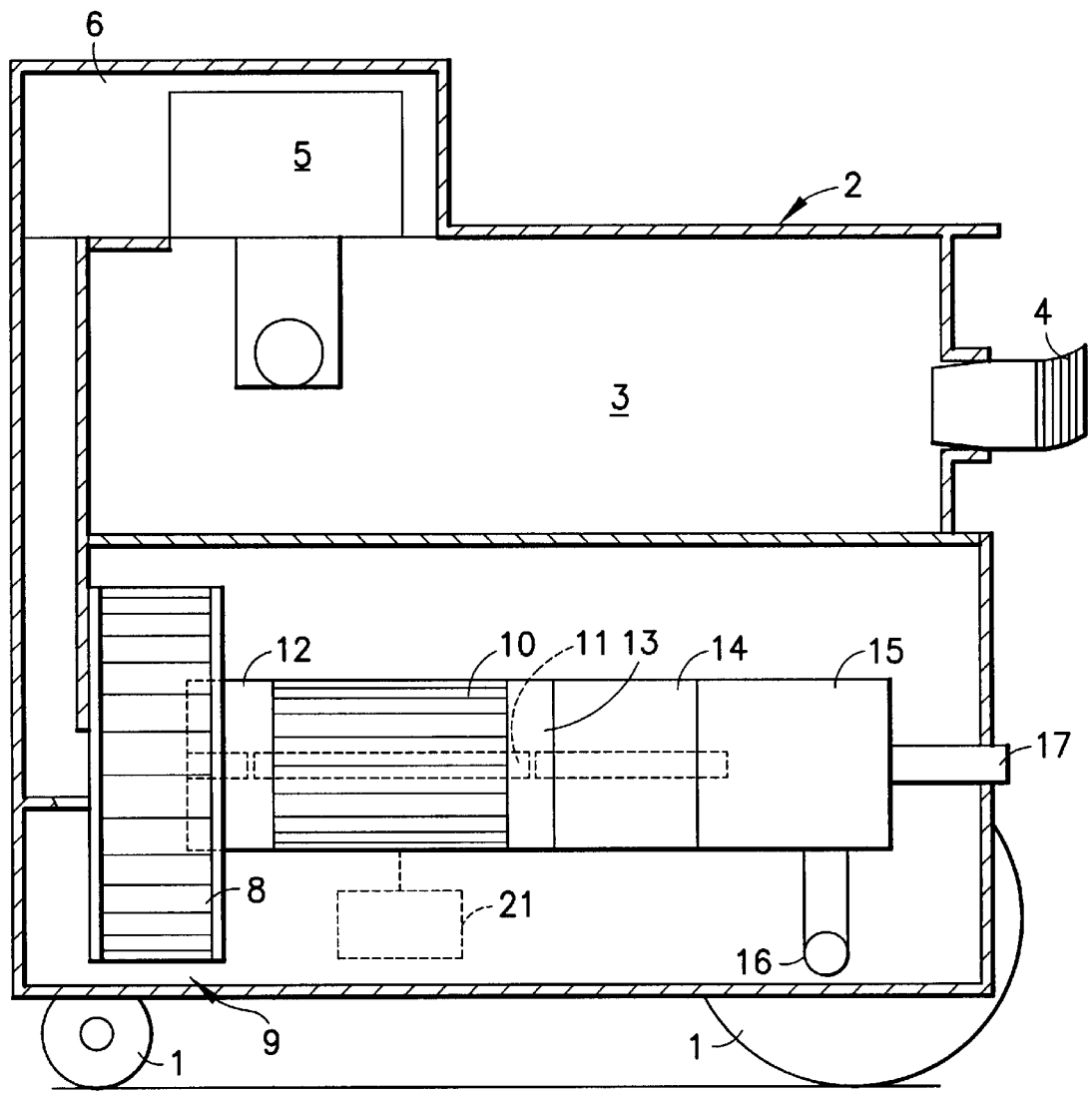
FIG. 2 shows a further exemplary embodiment of the invention.

In a modified embodiment as shown in FIG. 2, this common axis could also be arranged horizontally, this then having the particular advantage that fluids escaping through faulty seals in the individual devices will not leak onto lower lying devices but will only drip downwardly and thereby not damage the other devices.

What is claimed is:

1. A combined high pressure cleaning and suction appliance incorporating a drive motor whose drive shaft drives both a high pressure pump and a suction fan via respective couplings, wherein:

switching means are provided which selectively actuate one of the two couplings and release the other one, the couplings are in the form of free-wheel couplings which permit rotational coupling to occur in only one direction of rotation, the two free-wheel couplings have opposed directions of permitted rotational coupling, and the switching means for selectively actuating and releasing the couplings reverse the direction of rotation of the drive shaft.

2. An appliance in accordance with claim 1, wherein the drive motor, the couplings, the high pressure pump and the suction fan are arranged to be mutually co-axial.

3. An appliance in accordance with claim 2, wherein one coupling and the high pressure pump are arranged at one end of the drive motor, whilst the other coupling and the suction fan are arranged at the opposite end thereof.

4. An appliance in accordance with claim 3, wherein the drive shaft is disposed vertically in the appliance.

5. An appliance in accordance with claim 3, wherein the drive shaft is disposed horizontally in the appliance.

6. An appliance in accordance with claim 2, wherein the drive shaft is disposed vertically in the appliance.

7. An appliance in accordance with claim 2, wherein the drive shaft is disposed horizontally in the appliance.

8. An appliance in accordance with claim 1, wherein a gearing is inserted between the coupling for the high pressure pump and the high pressure pump.

9. An appliance in accordance with claim 1, wherein a gearing is inserted between the coupling for the suction fan and the suction fan.

* * * * *